US012284490B2

(12) United States Patent
Møller et al.

(10) Patent No.: US 12,284,490 B2
(45) **Date of Patent: *Apr. 22, 2025**

(54) SPEAKER UNIT FOR A HEARING AID DEVICE SYSTEM, AND HEARING AID DEVICE SYSTEM

(71) Applicant: Oticon A/S, Smørum (DK)

(72) Inventors: Mathias Rask Møller, Smørum (DK); Peter Steutel, Smørum (DK); Ole Andersen, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,568

(22) Filed: Jul. 21, 2023

(65) Prior Publication Data

US 2024/0022866 A1 Jan. 18, 2024

Related U.S. Application Data

(63) Continuation of application No. 17/863,067, filed on Jul. 12, 2022, which is a continuation of application (Continued)

(30) Foreign Application Priority Data

Mar. 9, 2018 (EP) .................................... 18161038

(51) Int. Cl.
*H04R 25/00* (2006.01)

(52) U.S. Cl.
CPC ......... *H04R 25/604* (2013.01); *H04R 25/305* (2013.01); *H04R 25/55* (2013.01);

(Continued)

(58) Field of Classification Search
CPC ........ H04R 2225/021; H04R 2225/025; H04R 2225/51; H04R 2420/09; H04R 25/305;

(Continued)

(56) References Cited

U.S. PATENT DOCUMENTS

| | | | |
|---|---|---|---|
| 7,500,747 | B2 | 3/2009 | Howell et al. |
| 8,437,489 | B2 | 5/2013 | Von Dombrowski et al. |

(Continued)

FOREIGN PATENT DOCUMENTS

| | | | |
|---|---|---|---|
| EP | 1 537 760 | B1 | 12/2008 |
| EP | 3116240 | A1 | 1/2017 |

*Primary Examiner* — Phylesha Dabney

(74) *Attorney, Agent, or Firm* — Birch, Stewart, Kolasch & Birch, LLP

(57) ABSTRACT

A speaker unit detachably mountable to a hearing aid device body configured to be positioned behind an ear of a wearer is disclosed. Further, hearing aid device system comprising the speaker unit is disclosed. The speaker unit comprises a contacting unit comprising at least one contact element and configured to be detachably mountable to a hearing aid device connector of said hearing aid device. The speaker unit further comprises a speaker unit body configured to be positioned at least partly in an ear canal of the wearer and comprising an output transducer unit configured to provide an acoustic signal based on an electrical signal input to said output transducer unit via said at least one contact element. The speaker unit further comprises a connecting unit provided between said speaker unit body and said contacting unit and including at least one wire configured to electrically connect said speaker unit body and said contacting unit. Further, the speaker unit comprises a memory unit configured to store data relating to said speaker unit.

18 Claims, 11 Drawing Sheets

Related U.S. Application Data

No. 17/081,777, filed on Oct. 27, 2020, now Pat. No. 11,477,585, which is a continuation of application No. 16/736,205, filed on Jan. 7, 2020, now Pat. No. 10,856,090, which is a continuation of application No. 16/297,045, filed on Mar. 8, 2019, now Pat. No. 10,567,892.

(52) U.S. Cl.
CPC ........... *H04R 25/556* (2013.01); *H04R 25/60* (2013.01); *H04R 2225/021* (2013.01); *H04R 2225/025* (2013.01); *H04R 2225/51* (2013.01); *H04R 2420/09* (2013.01)

(58) Field of Classification Search
CPC ...... H04R 25/55; H04R 25/556; H04R 25/60; H04R 25/604
USPC .......................................................... 381/312
See application file for complete search history.

(56) References Cited

U.S. PATENT DOCUMENTS

| | | | | |
|---|---|---|---|---|
| 8,781,141 | B2 * | 7/2014 | Higgins | H04R 25/55 381/313 |
| 10,028,066 | B2 | 7/2018 | Schmidt et al. | |
| 10,310,296 | B2 | 6/2019 | Howell et al. | |
| 2001/0043708 | A1 | 11/2001 | Brimhall | |
| 2005/0248717 | A1 | 11/2005 | Howell et al. | |
| 2006/0023158 | A1 | 2/2006 | Howell et al. | |
| 2006/0153418 | A1 | 7/2006 | Van Halteren | |
| 2006/0159298 | A1 | 7/2006 | Von Dombrowski et al. | |
| 2009/0304216 | A1 | 12/2009 | Hansen | |
| 2010/0195853 | A1 | 8/2010 | Joschika | |
| 2011/0091060 | A1 | 4/2011 | Von Dombrowski et al. | |
| 2011/0091061 | A1 | 4/2011 | Von Dombrowski et al. | |
| 2014/0185851 | A1 | 7/2014 | Van Halteren | |
| 2016/0360328 | A1 | 12/2016 | Schmidt et al. | |
| 2019/0281396 | A1 | 9/2019 | Møller et al. | |

* cited by examiner

SPEAKER UNIT FOR A HEARING AID DEVICE SYSTEM, AND HEARING AID DEVICE SYSTEM

This application is a Continuation of co-pending U.S. application Ser. No. 17/863,067 filed on Jul. 12, 2022, which is a Continuation of U.S. patent application Ser. No. 17/081,777 filed on Oct. 27, 2020, now U.S. Pat. No. 11,477,585 issued on Oct. 18, 2022, which is a Continuation of U.S. patent application Ser. No. 16/736,205, filed on Jan. 7, 2020, now U.S. Pat. No. 10,856,090 issued on Dec. 1, 2020, which is a Continuation of U.S. patent application Ser. No. 16/297,045 filed on Mar. 8, 2019, now U.S. Pat. No. 10,567,892 issued on Feb. 18, 2020, which claims priority under 35 U.S.C. § 119 (a) to European Patent Application No. EP 18161038.7 filed on Mar. 9, 2018. Each of the above applications is hereby expressly incorporated by reference, in its entirety, into the present application.

The present disclosure relates to hearing aid device systems having a speaker unit that may be detached from a hearing aid device body of the hearing aid device system. Further, the present disclosure relates to speaker units that may be attached to a hearing aid device body of such hearing aid device systems.

As the market for receiver-in-the-ear (RITE) hearing devices, in particular for hearing aids (HA's), increases, even more RITE modules with different receivers, included in a so-called speaker unit, will come to co-exist in the coming years.

Here, a RITE hearing aid generally consists of two independent parts, an amplifier unit and a speaker unit (SU).

A strategy for identifying and distinguishing these RITE modules is needed to ensure that future HA solutions will not impose damage and/or distorted sound and/or produce uncomfortable, i.e. too loud, or too weak, sound levels to the end user in case of attaching to a hearing device a wrong speaker unit, e.g. one with a higher or lower sensitivity than expected during fitting. Also, if a specific RITE module is configured for being specifically used at a either the left or the right ear, e.g. by pre-bending or with an ear-mold adapted for the left/right ear, there is a need for ensuring that the hearing aid is connected to the correct/expected speaker. This is also important in case the user has an uneven hearing loss. Then identifying the left/right speaker unit being connected may be combined with adapting the hearing loss compensation with the current speaker as it could be expected that the user then place the hearing aid at the respective ear, i.e. if a left-ear speaker unit is connected, the hearing aid could configure the hearing loss compensation to compensate for the specific hearing loss at that ear.

A mechanical differentiation between different modules is possible, e.g. by having different connectors with different mechanical properties, e.g. form factors. Such solution, however, increases cost of production and the complexity of handling of several different variants of the same component/module.

In practice, each individual speaker unit will have (slightly) different physical properties, e.g. frequency response, depending firstly on receiver type and secondly on product variations within a given type. The receiver type could be based on which fitting level it is meant for, e.g. 85 dB, 105 dB or 117 dB, as a larger maximum output level typically entail a larger, or at least different, loudspeaker. Knowledge of the exact properties, in particular but not limited to the frequency response, of a given receiver can be used to obtain a more precise amplification, possibly without requiring that the type is known by the hearing aid in advance. Knowledge of the properties of a particular receiver is useful not only in a hearing device where the receiver is located in a separate body but also in a hearing aid, where the receiver is implemented in the hearing aid-body, e.g. in the same housing as a processing unit.

When fitting the hearing aid, only the amplifier information can be detected by a fitting system. The SU is not specifically known by the fitting system, only cursory information about it is typed in by a fitter. This approach carries risk of entering wrong information, with associated risk that the sound in the hearing aid being too loud or too soft for the user, or even damage to either the SU or the hearing aid device.

Besides initial fitting, during the product life time, the SU typically needs replacement, which is sometimes done by the end user. As the end user does not have such fitting system available, the hearing aid may be not optimally adjusted, since the new SU may have physical properties different from those of the replaced SU based on which the fitting was effected.

Therefore, there is a need to provide a solution that addresses at least some of the above-mentioned problems.

The present disclosure provides at least an alternative to the prior art.

According to an aspect of the present disclosure, there is provided a speaker unit detachably mountable to a hearing aid device body, where the hearing aid device body may be configured to be positioned behind an ear of a wearer.

The speaker unit comprises a contacting unit, which may comprise at least one contact element and the speaker unit may be configured to be detachably mountable to a hearing aid device connector of said hearing aid device. The contacting unit and the hearing aid device connector may be configured in a plug-socket configuration so that the two parts mate.

The speaker unit may further comprise a speaker unit body configured to be positioned at least partly in an ear canal of the wearer. The speaker unit body may also be termed a speaker unit housing. The speaker unit body may comprise an output transducer unit configured to provide an acoustic signal based on an electrical signal input to said output transducer unit received via said at least one contact element.

The speaker unit may further comprise a connecting unit provided between said speaker unit body and said contacting unit and including at least one wire configured to electrically connect said speaker unit body and said contacting unit. In the present context, a wire may be seen as metal drawn out into the form of a flexible thread or rod, preferably relatively thin compared to the length. A wire may have a cylindrical or elliptical cross section. A wire is preferably electrically conductive. Wire comes in solid core, stranded, or braided forms. Wire may include a solid core, be stranded, or have a braided form.

The speaker unit further comprises a memory unit configured to store data relating to said speaker unit. The data in the memory unit may be written to the memory unit before the speaker unit is connected to the hearing aid device, e.g. in production. The data may include a specific identification number uniquely identifying the specific speaker unit. The data may include type identification identifying the speaker unit as being of a specific type, e.g. within a specific maximum output level. The data may include data written to the memory by the hearing aid device. Such data written by the hearing aid device may include date of first use, accumulated usage time, maximum output level reached, drop events, i.e. indication from a sensor that the hearing aid device, including the speaker, has been dropped. This information may be relevant as the drop may induce damage to the speaker. The information may be read by the hearing aid device, and possibly serve as basis for a decision to have the speaker replaced. This data could e.g. be sent via an internet connection to a server where the hearing health care professional takes appropriate action, and/or the information may be provided to the user, e.g. via a graphical user interface on a smartphone, tablet, computer or the like or via an audio message to the user.

The memory unit configured to store data relating to said speaker unit may be arranged in the speaker unit body in connection with or on a printed circuit board and wherein an additional printed circuit board may also be arranged in the speaker unit body. In such a case, at least one decoupling element may be arranged between the printed circuit board and the additional printed circuit board so as to electromagnetically decouple the two printed circuit boards. This could reduce unwanted coupling of signals from one printed circuit board to the other. This could be advantageous especially if one of the printed circuit boards were attached to an element acting as at least part of an antenna. Such an element could for instance be the connecting element which, as described elsewhere, may be at least part of an antenna. This could be even more advantageous when the printed circuit board that is not connected to an antenna, includes components that are sensitive to noise around the operational frequency of the antenna.

The contacting unit may comprise a number of contact elements, such as six contact elements including said at least one contact element and a tab. Then, the six contact elements may be distributed over a first side of said tab and a second side of said tab, said second side being opposite to said first side of said tab. Further, in such case, said tab may be configured to be received in a slot of said hearing aid device connector of said hearing aid device to thereby contact said six contact elements with corresponding contact surfaces of said hearing aid device connector of said hearing aid device. Even further, or alternatively, all contact elements may be distributed over a first side of said tab and none on a second side of said tab, said second side being opposite to said first side of said tab.

The tab may be a solid tab. The tab may be a flexible tab or a rigid tab or a semi-rigid tab. The tab may have a visible part extending from a surface of the contacting unit. This visible part may have a generally oblong geometry.

Among the contact elements, some may be configured for specific purposes, such as two receiver contact elements may be configured to conduct said electrical signal to be input to said output transducer unit. One or more contact elements may further be configured as a power contact element configured to receive a positive power input. One or more contact elements may further be configured as a ground contact element, possibly configured to receive a negative power input. In case six contact elements are used, these may comprise an $I^2C$ bus clock contact element configured to conduct an $I^2C$ bus clock input signal. One or more contact elements may further be configured as an $I^2C$ bus data contact element configured to conduct an $I^2C$ bus data signal. All, or at least a subset, of the contact elements may be configured to be used as part of a communication interface, such as an $I^2C$ interface.

The memory unit may be electrically connected to at least said $I^2C$ bus clock contact element and said $I^2C$ bus data contact element.

The speaker unit body may comprise at least one of a sensor and a microphone. In such case, the at least one of said sensor and said microphone may be electrically connected to at least said $I^2C$ bus clock contact element and said $I^2C$ bus data contact element and/or said memory unit. A processor may be connected between the at least one of said sensor and said microphone and the at least said $I^2C$ bus clock contact element and said $I^2C$ bus data contact element and/or said memory unit.

The memory unit may be arranged on or in connection with said tab. The memory unit may be constituted by a single or several units or elements. The memory unit may be part of another unit, such as a processor. The memory unit may be a non-volatile memory unit. The memory unit may be accessible for both reading and writing, or only reading or only writing.

The memory unit may be provided on one of said first side and said second side of said tab, and at least one further electronic component may be provided on the other or same of said first side and said second side of said tab.

The memory unit may be arranged in said contacting unit. This may eliminate the need for arranging the use of some of the electrically conductive leads for communicating with the memory unit compared to having the memory unit arranged in or at the speaker unit body.

The connecting unit may include two receiver contact wires including said at least one wire, said two receiver contact wires being configured to conduct said electrical signal to be input to said output transducer unit.

Alternatively, the memory unit may be arranged in said speaker unit body.

The connecting unit may include six wires including said at least one wire. The six wires may comprise two receiver contact wires configured to conduct said electrical signal to be input to said output transducer unit. The six wires may comprise a power contact wire configured to receive a positive power input. The six wires may further comprise a ground contact wire configured to receive a negative power input. The six wires may further comprise an $I^2C$ bus clock contact wire configured to conduct an $I^2C$ bus clock input signal. The six wires may further comprise an $I^2C$ bus data contact wire configured to conduct an $I^2C$ bus data signal.

The speaker unit may further comprise a multi-purpose audio and sensor system. In such case, the connecting unit may include five wires including said at least one wire. Then, the five wires may be arranged to include a power contact wire configured to receive a positive power input. Further, the five wires may be arranged to include a ground contact wire configured to receive a negative power input. Further, the five wires may be arranged to include at least one data wire. Each of the at least one data wire may be an $I^2C$ bus data wire. In such case, the multi-purpose audio and sensor system may be electrically connected to each of said five wires.

The speaker unit may further comprise a printed circuit board. In such case, the memory unit may be provided on said printed circuit board.

The printed circuit board may comprise at least one further electronic component.

One or more, or even all, components arranged in connection with a printed circuit board in a speaker unit according to the present disclosure may be embedded in one or more printed circuit boards in or at the speaker unit. This could include e.g. embedding memory unit or units, processor or processors, ESD diode components or any other kinds of components.

The memory unit may be provided on a first side of said printed circuit board. The at least one further electronic component may be provided on a second side of said printed circuit board opposite to said first side of said printed circuit board.

The printed circuit board may be arranged on a back of said output transducer unit with respect to an outlet of said output transducer unit.

Alternatively, the printed circuit board may be arranged on a side of said output transducer unit with respect to an outlet of said output transducer unit.

The speaker unit may further comprise a temperature sensor. The temperature sensor may be provided on or in connection with said printed circuit board. This may allow performing one or more temperature measurements at or near the skin surface of an ear canal of a person wearing such a speaker unit. The thermal conduct medium between the skin surface and the sensor may be at least one of: Air in ear canal, with possible access through a receiver output port, thermal conduction through a plastic housing via a dome to the skin surface of the ear canal, thermal conduction directly through a dome to a skin surface in the ear canal.

Alternatively or additionally, the speaker unit may further comprise a temperature sensor provided on a front of said output transducer unit with respect to an outlet of said output transducer unit and connected to said printed circuit board via e.g. a flexible flat cable or other electrical conductor.

The memory unit may be a non-volatile random access memory.

The data relating to said speaker unit may comprise at least one of an output level of said output transducer, a right/left identification of said speaker unit, an output transducer size, a length of said connecting unit, output transducer calibration data, microphone data, an transducer type, information regarding output transducer capabilities, speaker unit type, information regarding speaker unit capabilities, a unique identifier of said speaker unit, a production date of said speaker unit, and a activation date of said speaker unit.

The at least one contact element may be formed by a contact pin, a contact pad, or a contact spring.

The speaker unit may include an antenna. The antenna may, at least partly, be arranged in the connecting unit and/or the connection unit and/or the speaker unit body. This antenna may include at least part of one of the wires included in the connecting unit. The antenna may also be provided separate from the provided wires, e.g. as a dedicated antenna element. A shield may be provided to minimize coupling with electrically communication between the hearing aid body and the speaker unit body and/or with other elements inside the hearing aid body. The shield may be a wire, connected or free-ended, in the speaker unit, e.g. coiled around one or more of the conductive elements/wires. Alternatively, a more dense net or solid shield with a structure similar to that of a coaxial cable. The shield may be configured to operate as a notch filter or a high pass or low pass filter.

A speaker unit according to the present disclosure may include more than one printed circuit board, e.g. two printed circuit boards arranged in a speaker unit body or housing to be arranged in the ear canal of a user. Such two printed circuit boards may be arranged e.g. perpendicular to each other, e.g. at two sides of a speaker unit housing. This could e.g. be so that length-wise directions of the printed circuit boards are arranged in a direction corresponding to the length-wise direction of the speaker unit housing, i.e. when the speaker unit body is mounted in an ear canal, this will be parallel, or substantially parallel, to the length-wise direction of the ear canal.

In such an example where two, or more, printed circuit boards are included in a speaker unit, one printed circuit board may be decoupled from the other at one or more frequencies. This could be achieved by one or more decoupling elements configured to block and/or attenuate electrical signals at least a certain frequencies or frequency range or ranges. One example could be a capacitor, an inductor, a coil, an electrical element constituting a filter, such as a low pass filter, a high-frequency choke element or other suitable element.

According to another aspect of the present disclosure, there is provided a hearing aid device system. The hearing aid device system comprises a hearing aid device body to be arranged behind an ear of a wearer and including an input transducer, a signal processor adapted to process a signal from the input transducer to compensate for the wearer's hearing loss, and a hearing aid device connector. The input transduce may be replaced by any other electronic sound signal source. The hearing aid device system further comprises a speaker unit according to the aspect discussed above. The speaker unit is connected to said hearing aid device connector via said contacting unit of said speaker unit.

BRIEF DESCRIPTION OF THE DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

Figure 1:
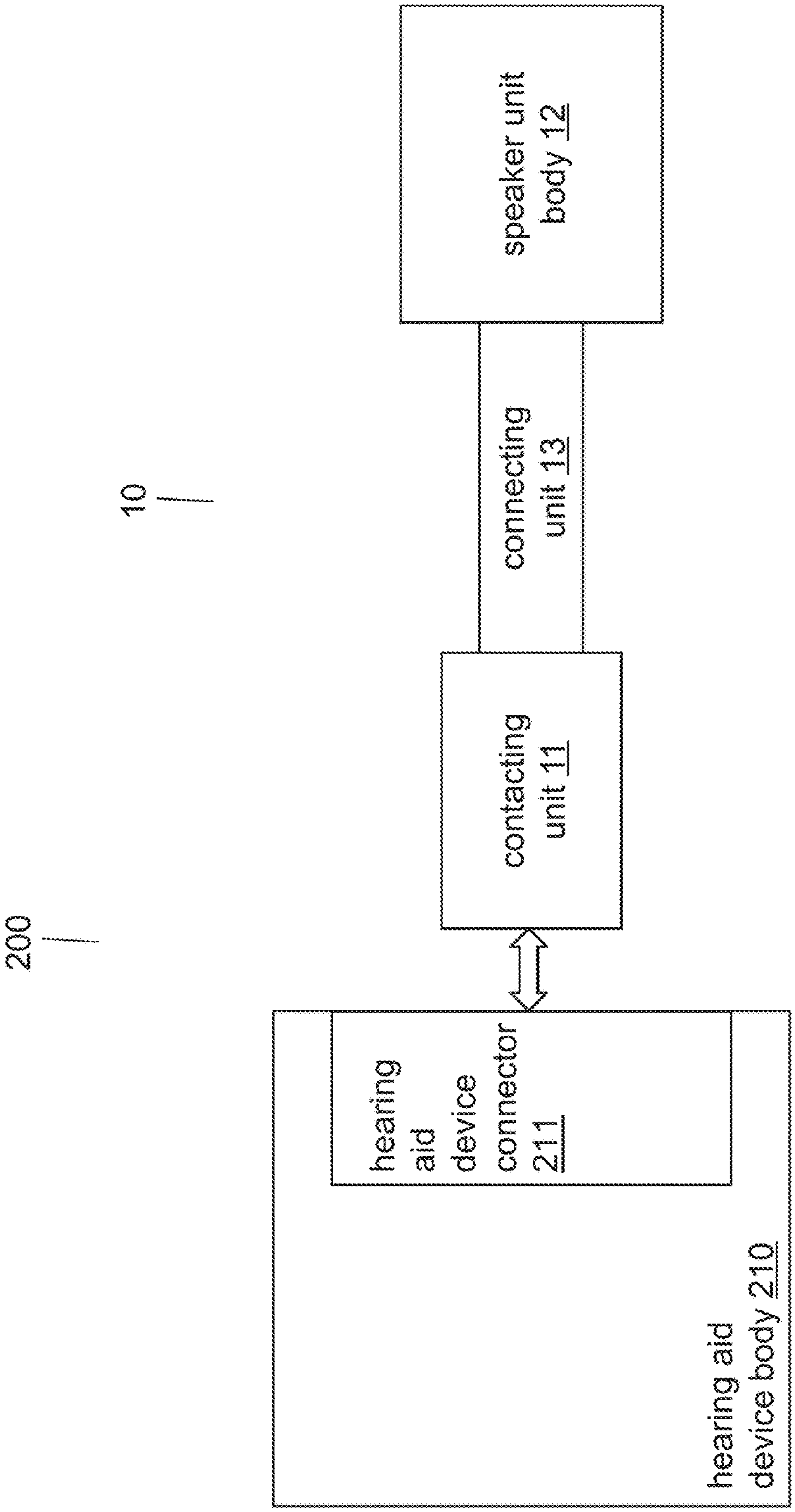
FIG. 1 illustrates a hearing aid device system.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include i) arranging a unit of the hearing device behind the ear with a tube leading air-borne acoustic signals into the ear canal or with a receiver/loudspeaker arranged close to or in the ear canal such as in a Behind-the-Ear type hearing aid, and/or ii) arranging the hearing device entirely or partly in the pinna and/or in the ear canal of the user such as in a In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

In the description of the present disclosure below, the term "hearing aid device system" is used synonym to the hearing device described above.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device. The remote control is adapted to control functionality and operation of the at least one hearing devices. The function of the remote control may be implemented in a SmartPhone or other electronic device, the SmartPhone/electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

Generally, according to the present disclosure, data is stored in a memory block which is arranged the speaker unit.

The data may be general data about, for example, size, left/right arrangement, power level, and potential sensor or microphone applications, such as sensor type and/or numbers of sensors, which may respectively coincide with data printed on the box of the SU.

This data can be stored in the memory by the manufacturer in connection with the final quality control.

The data can also be individual test data from a supplier's final inspection of the SU. The data could include, for example, frequency response, maximum power output and distortion data which could be used for a more precise fitting of the hearing aid.

The present disclosure allows more detailed information than a power level of the SU and thus, enables more precise application of the SU.

Accordingly, embodiments of the present disclosure enable remote fitting. In remote fitting situation, when no hearing health care professional is present to warrant patient safety and optimum fitting, an automatic check if the correct speaker unit is applied to the correct amplifier is even more important. Risk of wrong fitting can result in undesirable fitting and in worst case situations result in too loud or too low sound level. The need for automatic detection is even more evident for end-users who are visual impaired.

When storing information in the SU according to embodiments of the present disclosure, the amplifier unit can automatically adapt to the replacement SU, even if there are differences. It can also prevent the application of a SU that does not suit the end user.

In addition, when speaker units have other features than emitting sound, e.g. sensor features or microphones, compatibility between the amplifier unit and the speaker unit can be checked according to embodiments of the present disclosure.

Thus, embodiments of the present disclosure enable speaker units and corresponding hearing aid device systems, in which the speaker unit comprises only a receiver/transducer, in which the speaker unit comprises a receiver and at least one sensor, in which the speaker unit comprises a receiver and a microphone, and/or in which the speaker unit comprises a receiver, at least one sensor, a microphone and potentially any intelligence (e.g. a further processor) in the speaker unit, where the speaker units are exchangeable with each other while the hearing aid device system or the hearing aid device body thereof (a control element therein) is able to adapt its own signal output to the characteristics, purposes and abilities of the currently connected speaker unit.

Now referring to FIG. 1 which illustrates a hearing aid device system according to an embodiment of the disclosure.

The hearing aid device system 200 comprises a hearing aid device body 210 and a speaker unit 10 connectable (detachably mountable) to the hearing aid device body 210. In particular, a contacting unit 11 of the speaker unit 10 is connectable (detachably mountable) to a hearing aid device connector 211 of the hearing aid device body.

The speaker unit further comprises a speaker unit body 12 and a connecting unit 13 connecting the speaker unit body 12 and the contacting unit 11.

In other words, the speaker unit also referred to as speaker comprises a unit 11 (e.g. a plug) for connecting to the hearing aid housing (hearing aid device body) configured to be positioned behind the ear/pinna of the user, a body 12 (e.g. an in-the-ear part, speaker housing) holding the actual output transducer, and a unit 13 (e.g. connecting member/cable assembly/flexible member) connecting the other two parts 11 and 12 and holding wires for electrical connection between the speaker unit and the hearing aid housing.

The in-the-ear part, which may be the speaker unit body as mentioned elsewhere, may be fitted with a flexible dome, either closed or open, so that it will not slip out of the hear canal and at the same time be comfortable to the user or be embedded in a mould shaped to fit the user's ear. This is most often done when a high amplification is needed and the exact fit ensures minimal risk of feedback at high levels.

The connecting unit 13 is configured to establish contact to a mating connector 211 of the hearing aid device body 210. The hearing aid device body 210 may for example comprise an input transducer, not illustrated here, for receiving ambient sound and converting it to an electrical signal. The electrical signal may be processed in the hearing aid device body 210 by a signal processor, not illustrated, so as to compensate for a user's hearing loss. The processor provides a processed signal. The processing usually comprises one or more of frequency dependent amplification, frequency transpositioning, frequency compression, filtering etc.

The speaker unit body 12 may for example comprises a receiver, not illustrated, and is configured to be positioned at or at least partly in an ear canal of a user. The receiver provides an acoustical output signal based on the processed signal. The connecting unit 13 connects the contacting unit 11 and the speaker unit body including the receiver. The connecting unit 13 may be a tube. Preferably, the connecting unit is a flexible tube or sleeve. The connecting unit 11 may comprise a number of conductors, e.g. wires. As illustrated later the number of conductors may be two or more.

As there is no standard size for human ears, a variety of lengths of the connecting unit 13 may be provided, e.g. as a set of connecting elements 13 from which a best match is chosen. Further, not all users have the same need for types of receiver (included in the speaker unit 10), some users may need a high sound pressure level in order to hear, whereas others does not require the same level.

For ensuring that the speaker unit 10 outputs a suitable signal to the user, a paring of the speaker unit 10 and the hearing aid device body 210, in particular (sound) processing/controlling components thereof, is advantageous. For this purpose a memory unit, here in the form of a micro-EEPROM is provided. The memory unit is provided in the speaker unit. The memory unit may be provided in the contacting unit 11 to reduce the need for additional conductors/wires in the connecting unit 13 needed to communicate with the memory unit to/from the hearing aid device body. However, alternatively, the memory unit may be provided in the speaker unit body 12.

As a further alternative, a memory unit is provided in the contacting unit 11, and another memory unit is provided in the speaker unit body 12.

When the speaker unit 10 is attached to the hearing aid device body 210, the electrical connection via the contacting unit 11/hearing aid device connector 211 enables the hearing aid device body 210 to read from the memory unit. Besides providing identification information, such as speaker type, and possibly left/right speaker unit identification, the memory unit is able to store information regarding speaker unit size and/or wire length, receiver calibration data, e.g. specifically measured transfer function/frequency response for the particular speaker unit, microphone data to improve directional performance. These data may be read by the hearing aid device body 210 from the memory unit. The data may be read each time the hearing aid device body 210 is powered on, but if the hearing aid device body 210 is able to detect that the speaker unit 10 has been detached in the period where the hearing aid device body 210 was not in operation, the need to read the data may be lessened. The hearing aid device body 210 preferably stores the last known speaker unit 10 connected to the hearing aid device body 210. The hearing aid device body 210 may then only confirm the identity of the speaker unit, e.g. by reading only part of the data stored in the memory unit, thereby shortening the time needed to read data. This could for instance be unique identification data.

By the hearing aid device body 210 knowing specifics about e.g. the receiver (potentially included in the speaker unit body 12), the processor of the hearing aid device body 210 may be able to more accurately take into considerations about the transfer function of that particular receiver, thereby increasing the acoustic performance for the user.

The hearing aid device connector 211 may be a socket having a number of conducting arms (or any other form of contacting surfaces), configured to establish electrical connection to electrically conductive contact elements of the contacting unit.

The number of conducting arms (or any other form of contacting surfaces) match the number of electrically conductive contact elements of the contacting unit 11. However, such match in number is not mandatory. The contacting unit 11 may comprise a tab supporting the electrically conductive contact elements, and the tab may fit the socket provided by the hearing aid device connector 211. Such tab may be designed such that the tab could be inserted in either orientation. However, the tab may also be designed such that that there is only one way of inserting the tab into the socket.

Figure 2:
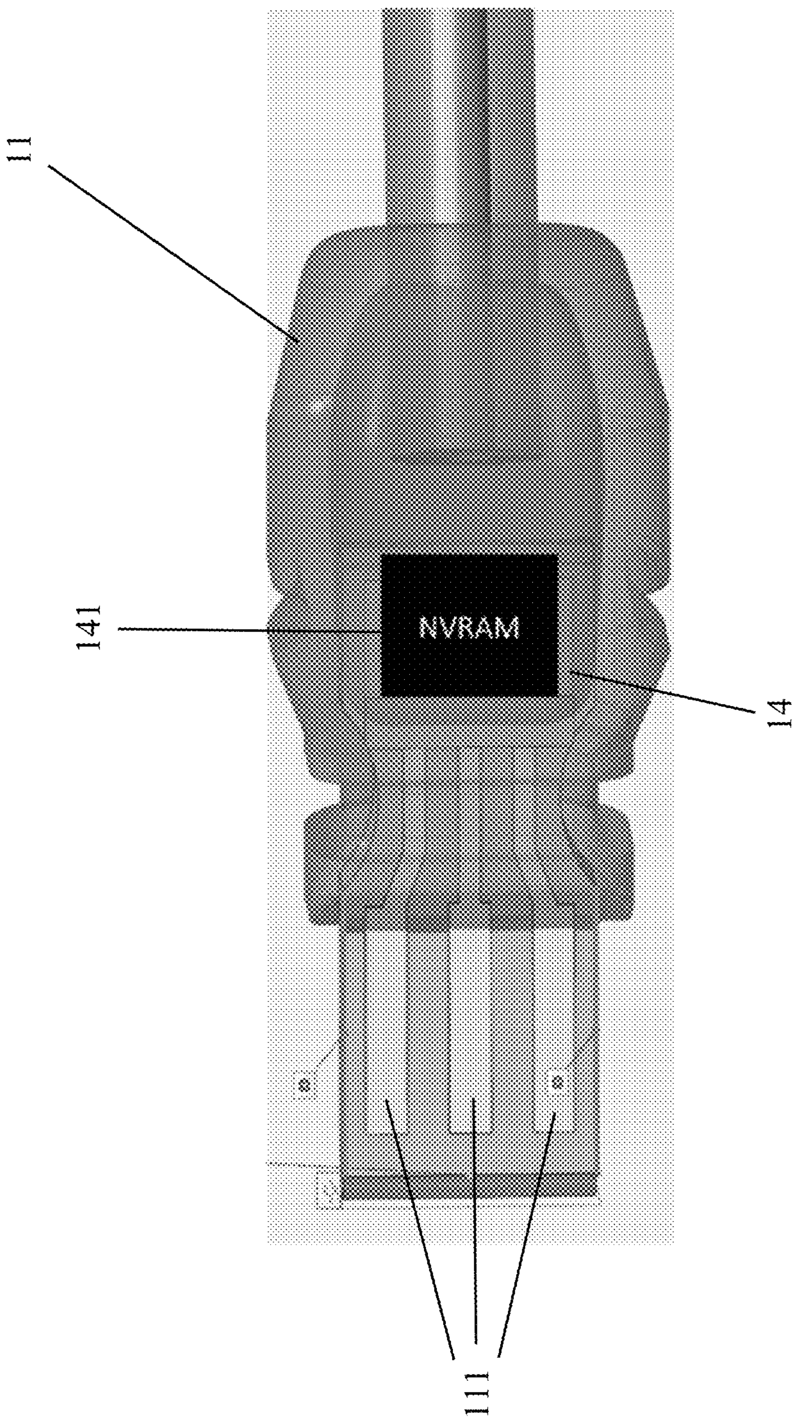
FIG. 2 illustrates a contacting unit.

Now referring to FIG. 2 which illustrates a contacting unit according to an embodiment of the disclosure.

As mentioned above, the memory unit may be provided in the contacting unit 11 or may be provided in the speaker unit body 12.

FIG. 2 illustrates an embodiment of the present disclosure having the memory unit 141 provided in the contacting unit 11.

The contacting unit comprises a tab and three contact elements 111 which are embodied as contact surfaces/pads/electrodes carried by the tab. Further three (or a different number of) contact elements may be provided at the opposite side of the tab.

The contact elements may be connected to a printed circuit board (PCB) 14 on which the memory unit 141 is provided. However, the memory unit may be connected to (some of) the contact elements in another way. For example, connections within the contacting unit 11 may be embodied by means of litz wires. The printed circuit board 14 may embody the tab of the contacting unit 11.

The contact elements 111 may correspond to power and ground contacts and to $I^2C$ contacts as an $I^2C$ bus clock contact (SCL) and an $I^2C$ bus data contact (SDL).

Further, some or all of the contact elements 111 may be electrically connected (via the connecting unit 13, i.e., conducting parts of the connecting unit, e.g. wires) to the speaker unit body 12, in particular elements of the speaker unit body.

Preferably, two wires dedicated to the transducer (receiver wires) are provided in the connecting unit.

The memory unit 141 may be a non-volatile random access memory (NVRAM).

The contacting unit 11 may be moulded.

A housing of the contacting unit 11 may be made by means of overmoulding or loose parts that are assembled.

Figure 3A:
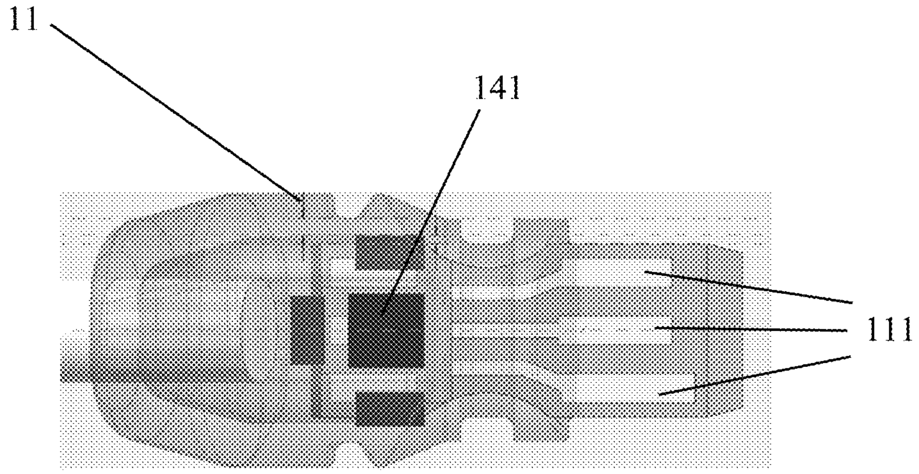
FIG. 3A illustrates a contacting unit.

Now referring to FIG. 3A which illustrates a contacting unit 11 according to an embodiment of the disclosure.

As can be seen on FIG. 3A illustrating the contacting unit 11 in a top view, the contact elements 111 may be of a same length or may be of different lengths. Further, as can be seen in that Figure, besides the memory unit 141 illustrated as the square in the middle of the contacting unit 11, further electronic components may be provided in the contacting unit.

If a printed circuit board 14 is provided in the contacting unit 11, the memory unit 141 and the further electronic components may be provided on a same side of the printed circuit board 14.

The further electronic components may be diodes. Preferably, the further electronic components are electrostatic discharge diodes.

Figure 3B:
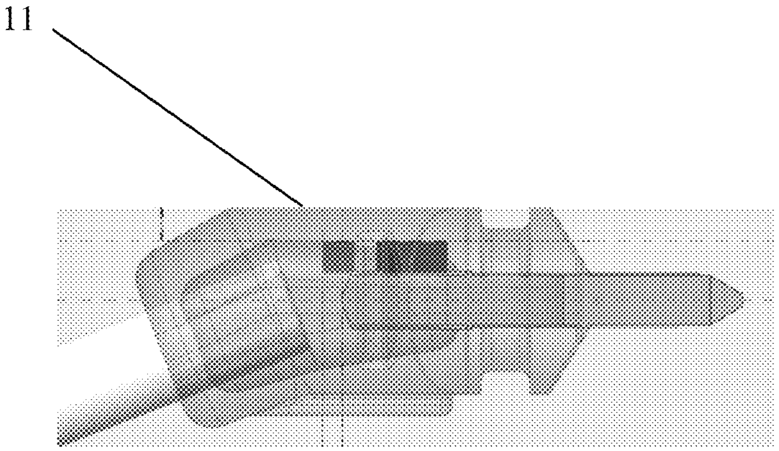
FIG. 3B illustrates the contacting unit.

Now referring to FIG. 3B which illustrates the contacting unit 11 according to an embodiment of the disclosure.

FIG. 3B illustrates the contacting unit 11 of FIG. 3A in a side view. As can be seen in FIG. 3B, the memory unit 141 and the further electronic components may be provided on a same side of the printed circuit board 14.

As can be further seen in this Figure, the connecting unit 13 may not extent axially from the contacting unit 11 (i.e. parallel to the printed circuit board 14) but instead may extend in an angled manner.

The angle, if any, is however not limited to the illustrated angle.

Figure 4A:
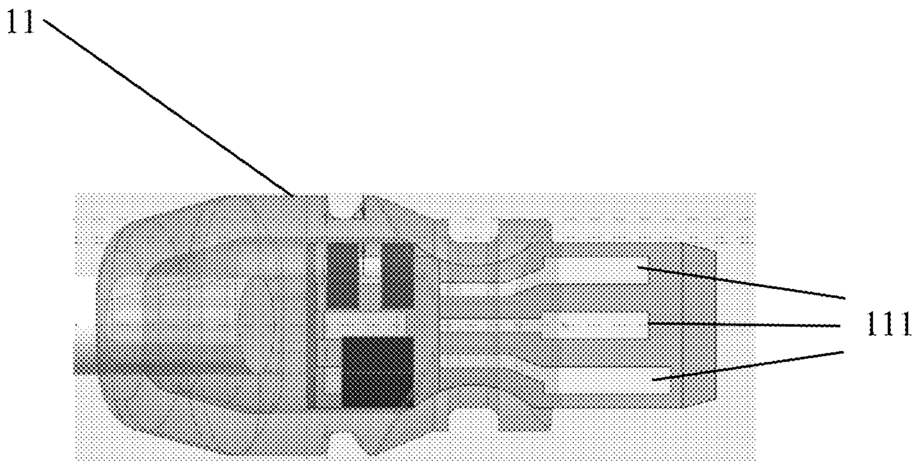
FIG. 4A illustrates a contacting unit.

Now referring to FIG. 4A which illustrates a contacting unit 11 according to an embodiment of the disclosure.

As can be seen on FIG. 4A illustrating the contacting unit 11 in a top view, the memory unit 141 and the further electronic components do not have to be arranged in a symmetric manner.

Figure 4B:
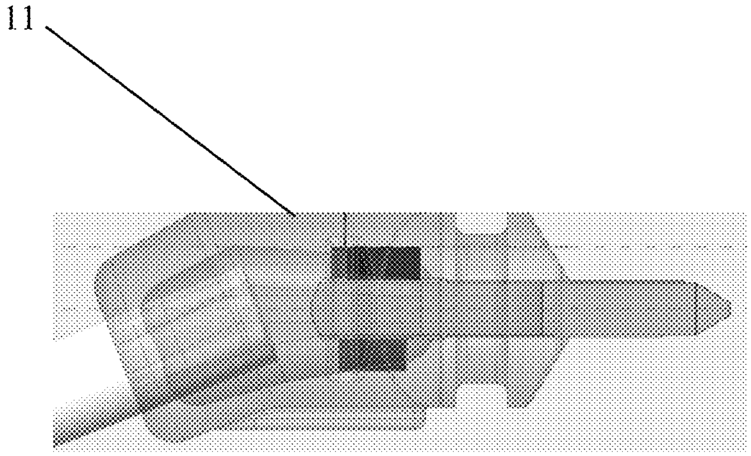
FIG. 4B illustrates the contacting unit.

Now referring to FIG. 4B which illustrates the contacting unit 11 according to an embodiment of the disclosure.

FIG. 4B illustrates the contacting unit 11 of FIG. 4A in a side view. As can be seen in FIG. 4B, the memory unit 141 and the further electronic components may be provided on different (opposite) sides of the printed circuit board 14. If more than two elements are arranged on the printed circuit board 14, these may be arbitrarily distributed over two opposite sides of the printed circuit board 14.

Figure 5A:
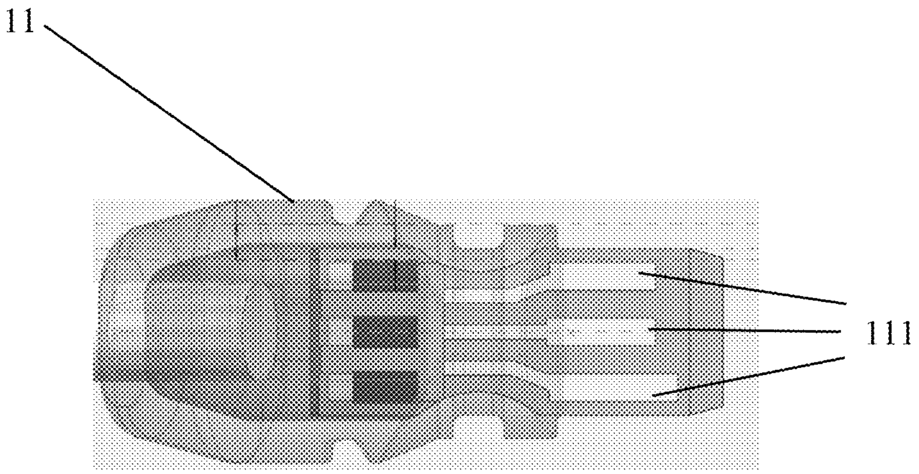
FIG. 5A illustrates a contacting unit.

Now referring to FIG. 5A which illustrates a contacting unit 11 according to an embodiment of the disclosure.

As mentioned above, the memory unit may be provided in the contacting unit 11 or may be provided in the speaker unit body 12.

FIG. 5A illustrates an embodiment of the present disclosure in a top view having the memory unit 141 not provided in the contacting unit 11.

Hence, further electronic components may be arbitrarily distributed over one side or over two opposite sides of the printed circuit board 14 without the memory unit 141.

Different arrangements and different orientations of the elements provided in the contacting unit lead to different outer dimensions of the contacting unit, allowing an adjustment of the outer dimensions of the contacting unit to the needs, e.g. dimensions allowed by the hearing aid device body 210 and in particular the hearing aid device connector 211 thereof.

Figure 5B:
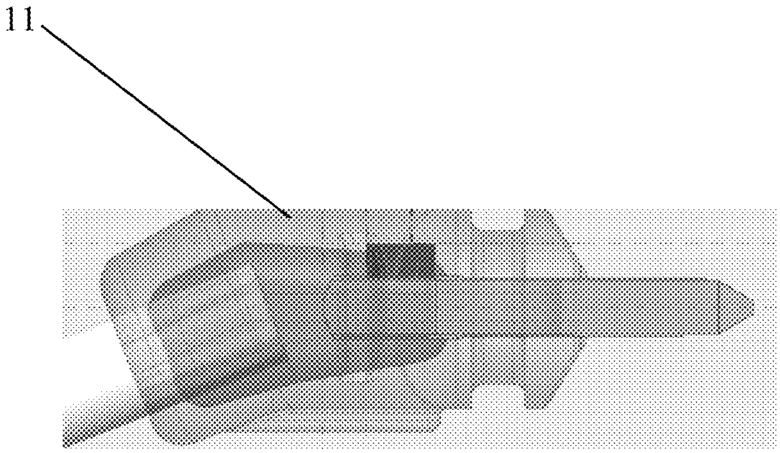
FIG. 5B illustrates the contacting unit.

Now referring to FIG. 5B which illustrates the contacting unit 11 according to an embodiment of the disclosure.

FIG. 5B illustrates the contacting unit 11 of FIG. 5A in a side view. As can be seen in FIG. 5B, the memory unit 141 is not provided in the contacting unit 11, and the further electronic components are provided on one side of the printed circuit board 14. However, as mentioned above, the further electronic components may be arbitrarily distributed over two opposite sides of the printed circuit board 14 without the memory unit 141.

Figure 6:
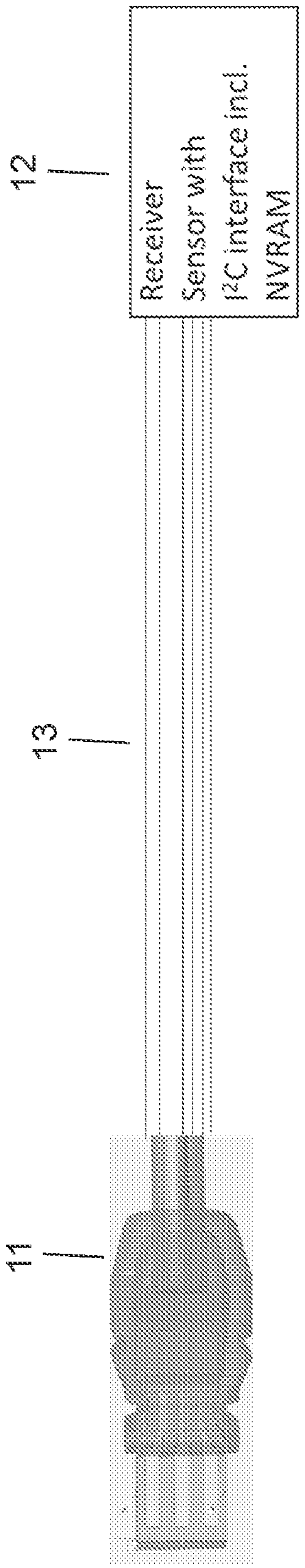
FIG. 6 illustrates a speaker unit.

Now referring to FIG. 6 which illustrates a speaker unit according to an embodiment of the disclosure.

As mentioned above, the memory unit 141 may be provided in the contacting unit 11 or may be provided in the speaker unit body 12.

FIG. 6 illustrates an embodiment of the present disclosure having the memory unit 141 provided in the speaker unit body 12.

In particular, the speaker unit body 12 illustrated in FIG. 6 comprises a receiver and optionally a sensor with an $I^2C$-interface and in addition the memory unit 141 embodied as NVRAM.

In such case, the connecting unit 13 includes two wires dedicated to the transducer (receiver wires). Further, the connecting unit 13 includes a power wire, a ground wire, an $I^2C$ bus clock wire and an $I^2C$ bus data wire which may be combined as $I^2C$ related wires.

The wires included in the connecting unit 13 connect respective contact elements 111 of the contacting unit with respective terminals of the electronic elements in the speaker unit body 12 including the transducer and the memory unit 141.

Figure 7:
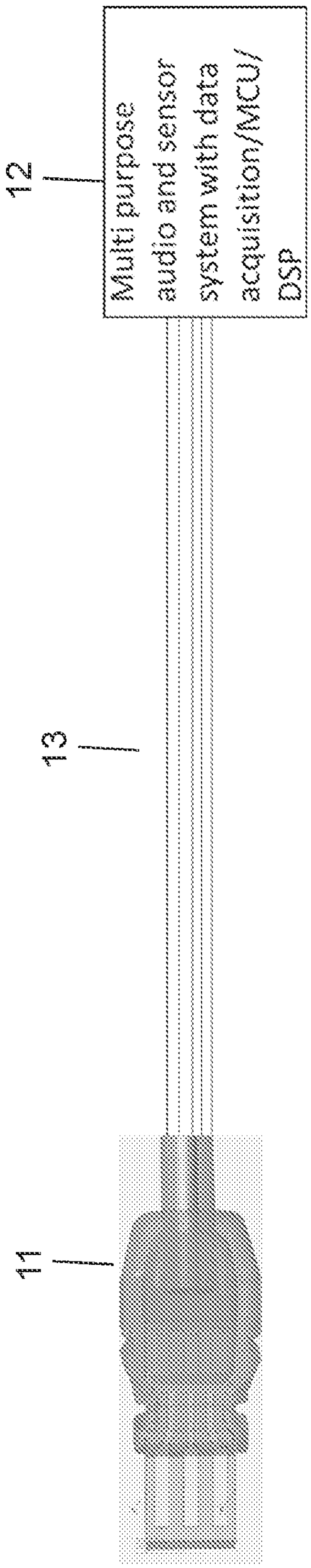
FIG. 7 illustrates a speaker unit.

Now referring to FIG. 7 which illustrates a speaker unit according to an embodiment of the disclosure.

FIG. 7 again illustrates an embodiment of the present disclosure having the memory unit 141 provided in the speaker unit body 12.

In particular, the speaker unit body 12 illustrated in FIG. 7 comprises a multi-purpose audio and sensor system with data acquisition/MCU/DSP, i.e., may embody an intelligent speaker unit. The speaker unit body 12 may further comprise the memory unit 141 embodied as NVRAM. Any of the elements included in the speaker unit body 12 may communication via an $I^2C$-interface.

In such case, the connecting unit 13 includes for example five wires including a power wire, a ground wire, and at least a data wire. Wires included in the connecting unit may be combined as $I^2C$ related wires.

The wires included in the connecting unit 13 connect respective contact elements 111 of the contacting unit with respective terminals of the electronic elements in the speaker unit body 12.

Figure 8:
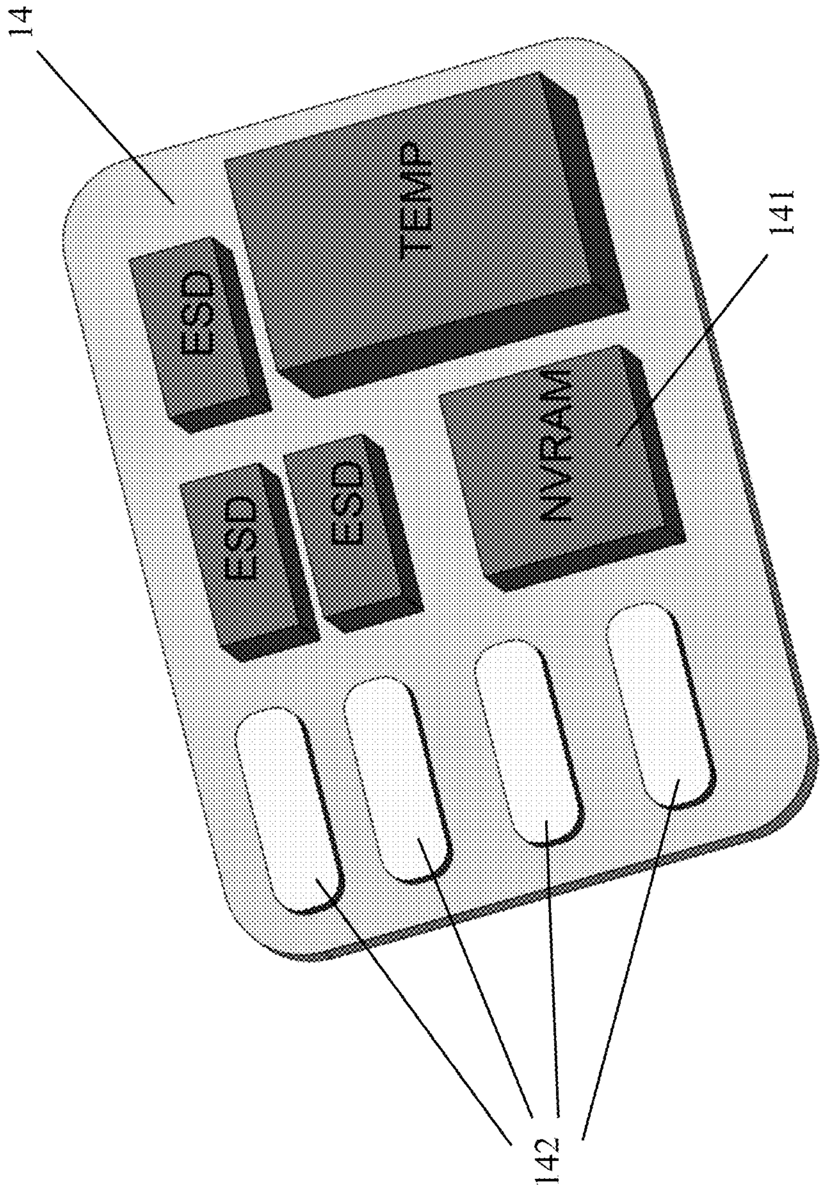
FIG. 8 illustrates a printed circuit board.

Now referring to FIG. 8 which illustrates a printed circuit board 14 according to an embodiment of the disclosure.

As can be seen on FIG. 8, a printed circuit board 14 according to embodiments of the present disclosure, whether provided in the contacting unit 11 or in the speaker unit body 12, may support contact elements 142 like electrodes or pads (e.g. solder pads). Further, the memory unit 141 may be provided on the printed circuit board 14. Further electronic components may be provided on the printed circuit board 14 as well. In addition, sensors just like a temperature sensor may be provided on the printed circuit board 14. The sensor may be accompanied with a sensor-to-$I^2C$-module.

The printed circuit board 14 is not limited to a one-side assembled board. Elements may be provided on both opposite sides of the printed circuit board 14. Further, the printed circuit board 14 may be a single-layer board or a two-layer board. The printed circuit board 14 may be a multi-layer board. The printed circuit board 14 may be coated or insulated in another form.

Figure 9A:
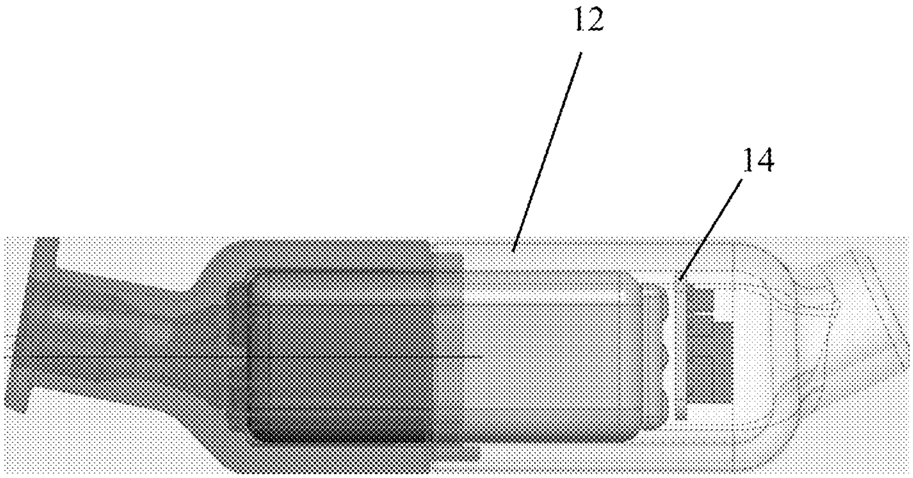
FIG. 9A illustrates a speaker unit body.

Now referring to FIG. 9A which illustrates a speaker unit body 12 according to an embodiment of the disclosure. In FIG. 9A, the left end of the speaker unit body 12 corresponds to a sound outlet on which a dome may be mounted. The right end corresponds to an opening in the speaker unit body 12 where a transition between the speaker unit body 12 and the connecting unit 13 is arranged.

FIG. 9A illustrates one option of accommodation of a printed circuit board 14 including the memory unit 141 (e.g. the printed circuit board illustrated in FIG. 8) in the speaker unit body 12.

In particular, the printed circuit board 14 may be arranged behind (i.e. on a back of) the transducer with respect to an outlet of the transducer.

The printed circuit board 14 may be arranged behind the transducer/receiver but distanced from the transducer.

When a temperature is arranged on the printed circuit board 14, the sensor is consequently located at a (rear) end of the speaker unit body 14. Thus, the temperature sensor will likely measure the air temperature outside the ear.

The position of the printed circuit board 14 as illustrated in FIG. 9A enables implementation of an easy wiring.

Alternatively, the printed circuit board 14 may be arranged on the transducer/receiver. Such arrangement would require additional (e.g. six, dependent on the wires in the connecting unit 13 and the contact elements 111 of the contacting unit 11) solder pads 142. Such arrangement may be preferably selected in case no (temperature) sensor is provided on the printed circuit board 14.

Figure 9B:
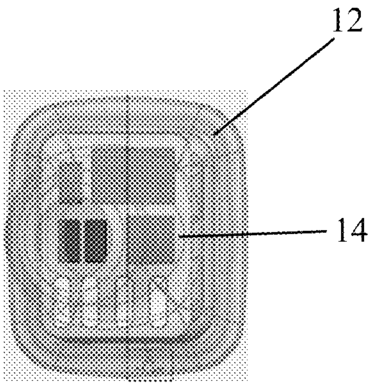
FIG. 9B illustrates the speaker unit body.

Now referring to FIG. 9B which illustrates the speaker unit body 12 according to an embodiment of the disclosure.

FIG. 9B particularly illustrates the arrangement of the printed circuit board 14 behind the transducer/receiver as explained with reference to FIG. 9A when seen from the (rear) end of the speaker unit body 12.

Figure 10A:
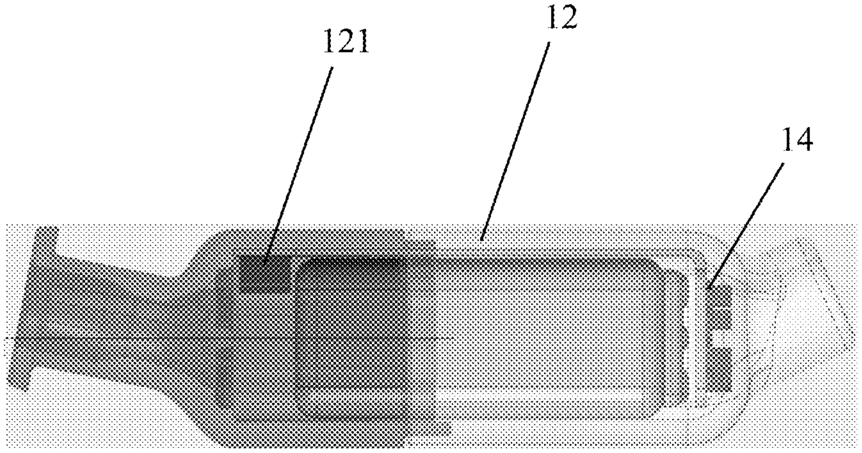
FIG. 10A illustrates a speaker unit body.

Now referring to FIG. 10A which illustrates a speaker unit body 12 according to an embodiment of the disclosure.

FIG. 10A illustrates another option of accommodation of a printed circuit board 14 including the memory unit 141 (e.g. the printed circuit board illustrated in FIG. 8) in the speaker unit body 12, where the printed circuit board 14 is as well arranged behind (i.e. on a back of) the transducer with respect to an outlet of the transducer.

However, as can be seen in FIG. 10A, a temperature sensor 121 is located at front of the transducer and is connected to the printed circuit board 14 by means of a flexible electric connection 122, e.g. a flat flexible cable (FFC).

According to such arrangement, the temperature sensor 121 has access to the air in front of the dome. In other words, the temperature sensor 121 will measure the air temperature inside the ear potentially with variation of receiver heating and only minor influence of the outside environment.

However, the printed circuit board 14 or at least the temperature sensor 121 may be exposed to the in-ear-climate and may thus be specifically capsuled.

Underfill material has excellent characteristics with respect to heat transfer and protection of surface mounter devices (SMD).

Figure 10B:
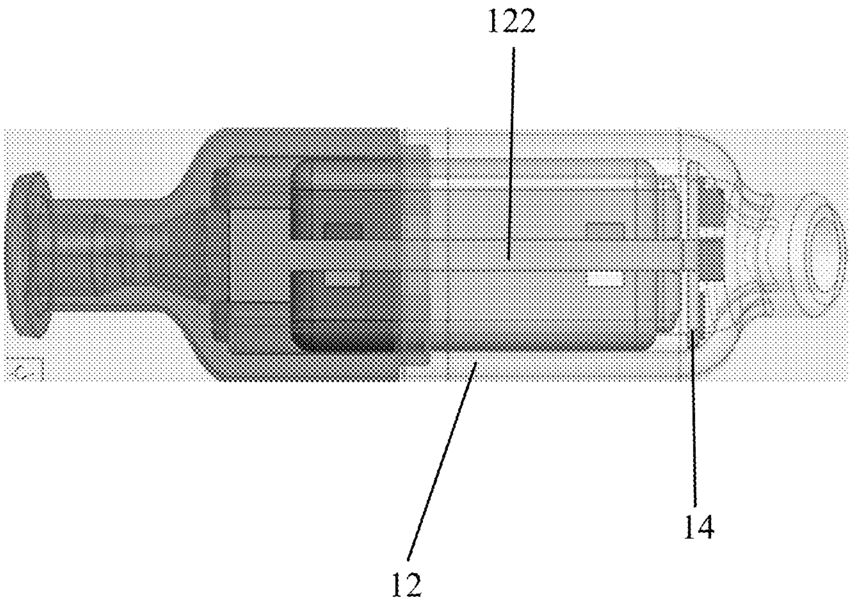
FIG. 10B illustrates the speaker unit body.

Now referring to FIG. 10B which illustrates the speaker unit body 12 according to an embodiment of the disclosure.

FIG. 10B illustrates the speaker unit body 12 of FIG. 10A in a top view.

Thus, in FIG. 10B, the course of the connection between the temperature sensor in front of the transducer and the printed circuit board behind the transducer (e.g. the FFC 122) is specifically well perceptible.

Figure 11A:
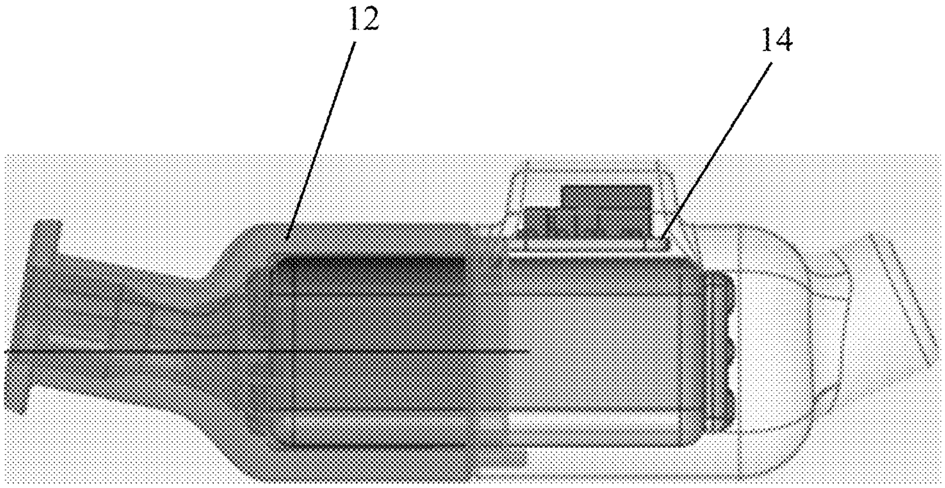
FIG. 11A illustrates a speaker unit body.

Now referring to FIG. 11A which illustrates a speaker unit body 12 according to an embodiment of the disclosure.

FIG. 11A illustrates another option of accommodation of a printed circuit board 12 including the memory unit 141 (e.g. the printed circuit board 14 illustrated in FIG. 8) in the speaker unit body 12, where the printed circuit board 14 is arranged on a side of the transducer.

With this arrangement, a temperature sensor placed on the printed circuit board 14 is arranged on a side of the speaker unit body 12.

A temperature sensor arranged this way will measure the ambient temperature in the ear canal potentially including receiver heating and minor influence of the outside environment.

Figure 11B:
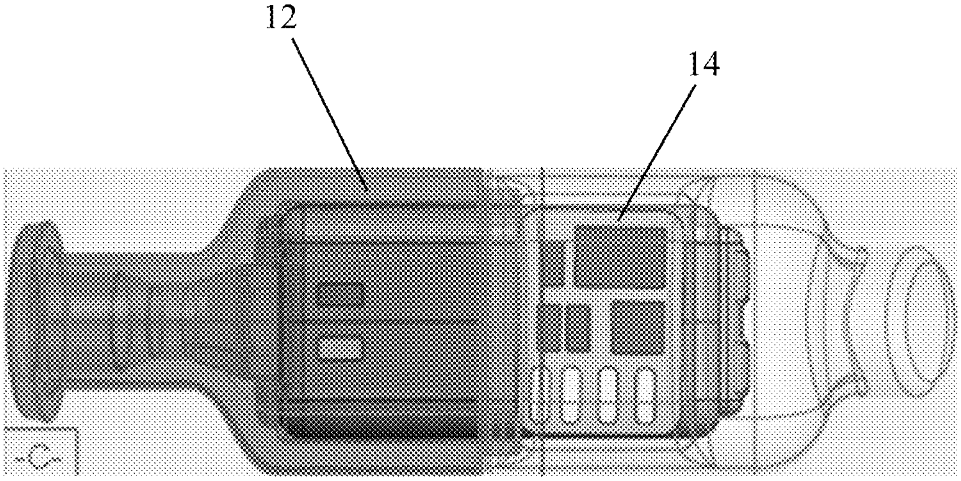
FIG. 11B illustrates the speaker unit body.

Now referring to FIG. 11B which illustrates the speaker unit body 12 according to an embodiment of the disclosure and in particular a top view of the speaker unit body 12 illustrated in FIG. 11A.

As used, the singular forms “a,” “an,” and “the” are intended to include the plural forms as well (i.e. to have the meaning “at least one”), unless expressly stated otherwise. It will be further understood that the terms “includes,” “comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A speaker unit detachably mountable to a hearing aid device body configured to be positioned behind an ear of a wearer, the speaker unit comprising:

a contacting unit comprising at least one contact element and configured to be detachably mountable to a hearing aid device connector of said hearing aid device:

a speaker unit body configured to be positioned at least partly in an ear canal of the wearer and comprising an output transducer unit configured to provide an acoustic signal based on an electrical signal input to said output transducer unit via said at least one contact element;

a connecting unit provided between said speaker unit body and said contacting unit and including at least one wire configured to electrically connect said speaker unit body and said contacting unit;

a tab, wherein the at least one contact element is arranged on at least one side of said tab; and first and second circuit boards, wherein one of said first and second printed circuit boards is decoupled from the other at one or more frequencies via one or more decoupling elements configured to block and/or attenuate electrical signals at least at a certain frequency or frequency range, or at certain frequency ranges.

2. The speaker unit according to claim 1, wherein one or more of the decoupling elements is one of: a capacitor, an inductor, a coil, an electrical element constituting a filter, and a high-frequency choke element or other suitable element.

3. The speaker unit according to claim 1, further comprising:

a memory unit configured to store data relating to said speaker unit.

4. The speaker unit according to claim 3, wherein said memory unit is arranged in said contacting unit.

5. The speaker unit according to claim 3, wherein said data relating to said speaker unit comprises at least one of an output level of said output transducer, a right/left identification of said speaker unit, an output transducer size, a length of said connecting unit, output transducer calibration data, microphone data, a transducer type, information regarding output transducer capabilities, speaker unit type, information regarding speaker unit capabilities, a unique identifier of said speaker unit, a production date of said speaker unit, identification of a sensor, and an activation date of said speaker unit.

6. The speaker unit according to claim 1, wherein:

said contacting unit comprises six contact elements including said at least one contact element and said tab, said six contact elements are distributed over a first side of said tab and/or a second side of said tab opposite to said first side of said tab, and said tab is configured to be received in a slot of said hearing aid device connector of said hearing aid device to thereby contact said six contact elements with corresponding contact surfaces of said hearing aid device connector of said hearing aid device.

7. The speaker unit according to claim 1, wherein said speaker unit body comprises at least one of a sensor and a microphone.

8. The speaker unit according to claim 1, wherein said connecting unit includes two receiver contact wires including said at least one wire, said two receiver contact wires being configured to conduct said electrical signal to be input to said output transducer unit.

9. The speaker unit according to claim 1, further comprising a multi-purpose audio and sensor system.

10. The speaker unit according to claim 1, further comprising a temperature sensor arranged to sense temperature of a skin part of an ear canal of a user when the speaker unit is mounted in the ear canal of the user.

11. The speaker unit according to claim 1, wherein said at least one contact element is formed by a contact pin, a contact pad, or a contact spring.

12. The speaker unit according to claim 1, wherein said connecting unit includes at least part of an antenna.

13. A hearing aid device comprising:

a hearing aid device body configured to be arranged behind an ear of a wearer and including an input transducer, a signal processor adapted to process a signal from the input transducer to compensate for the wearer's hearing loss, and a hearing aid device connector, and a speaker unit detachably mountable to the hearing aid device body, the speaker unit comprising:

a contacting unit comprising at least one contact element and configured to be detachably mountable to said hearing aid device connector of said hearing aid device;

a speaker unit body configured to be positioned at least partly in an ear canal of the wearer and comprising an output transducer unit configured to provide an acoustic signal based on an electrical signal input to said output transducer unit via said at least one contact element;

a connecting unit provided between said speaker unit body and said contacting unit and including at least one wire configured to electrically connect said speaker unit body and said contacting unit;

a tab, wherein the at least one contact element is arranged on at least one side of said tab; and first and second circuit boards, wherein one of said first and second printed circuit boards is decoupled from the other at one or more frequencies via one or more decoupling elements configured to block and/or attenuate electrical signals at least at a certain frequency or frequency range, or at certain frequency ranges.

14. The hearing aid device according to claim 13, wherein one or more of the decoupling elements is one of: a capacitor, an inductor, a coil, an electrical element constituting a filter, and a high-frequency choke element or other suitable element.

15. The hearing aid device according to claim 13, wherein an antenna is at least partly formed by a wire in the connecting unit.

16. The hearing aid device according to claim 13, further comprising:

a memory unit configured to store data relating to said speaker unit.

17. The hearing aid device according to claim 16, wherein said memory unit is arranged in said contacting unit.

18. The hearing aid device according to claim 16, wherein said data relating to said speaker unit comprises at least one of an output level of said output transducer, a right/left identification of said speaker unit, an output transducer size, a length of said connecting unit, output transducer calibration data, microphone data, a transducer type, information regarding output transducer capabilities, speaker unit type, information regarding speaker unit capabilities, a unique identifier of said speaker unit, a production date of said speaker unit, identification of a sensor, and an activation date of said speaker unit.

* * * * *